Dec. 15, 1959   B. DUBSKÝ ET AL   2,917,692
ELECTROMAGNETIC VIBRATOR
Filed Sept. 26, 1957
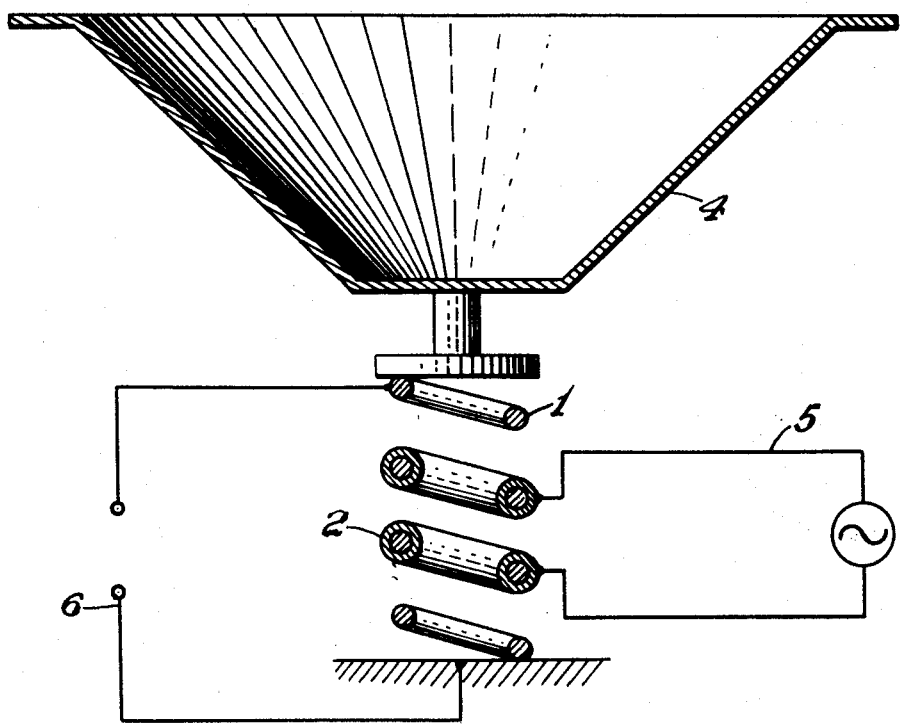
INVENTORS
Bořivoj Dubsky, Oldřich Straka
BY

United States Patent Office 2,917,692
Patented Dec. 15, 1959

2,917,692

ELECTROMAGNETIC VIBRATOR

Bořivoj Dubský and Oldřich Straka, Prague, Czechoslovakia, assignors to Výzkumný a zkušební letecký ústav, Letnany, near Prague, Czechoslovakia Application September 26, 1957, Serial No. 686,512

Claims priority, application Czechoslovakia
October 4, 1956

1 Claim. (Cl. 318—124)

The present invention relates to an electromagnetic vibrator based on the utilization of the magnetostrictional properties of ferromagnetic materials.

Various vibrators utilizing the magnetostrictional properties of ferromagnetic materials are known. Such vibrators usually consist of a tubular torsional body, excited by direct current passing either directly therethrough or through a torroidal winding and also excited by alternating current passing through a coil coaxially surrounding the torsional body. Under the influence of the two currents the body is set into torsional oscillations, the frequency of which is identical with that of the alternating current fed to the coil. It is a disadvantage of these vibrators that, at lower frequencies, they are relatively inefficient and usually yield a low output.

The essential feature of the electromagnetic vibrator according to the present invention is a torsional ferromagnetic body wound into a helix in the shape of a spring and through which a direct current is passed, while the alternating current is passed through a helical coil wound directly on the torsional body so that the axis of the coil coincides with the helical axis of the body. The natural frequency of the system is thus substantially reduced and at the same time the torsional oscillations of the body are transformed into longitudinal oscillations of the spring, which may be directly connected to a diaphragm. Due to this arrangement the efficiency in the transmission of lower frequencies is also increased.

The accompanying drawing shows in a diagrammatic elevational view an example of the electromagnetic vibrator according to the invention.

The torsional body 1 is formed by winding a rod or a tube of ferromagnetic material into the shape of a spring with the longitudinal axis of body 1 forming a helix. Both ends of the body are connected to an exciting circuit 6 supplied from a source of direct current. Wire is wound coaxially on the helical body 1 to form a coil 2 having a helical axis which coincides with the helical axis of body 1. Coil 2 is connected through a circuit 5 to a source of alternating current. The body 1 is rigidly fastened at one of its ends, its other end being connected to a consumer 4 of oscillations, e.g. to a diaphragm.

When direct current flows through the body 1, a magnetic field is produced in which there occur cylindrical areas of equal magnetic intensity coaxial with the helical axis of body 1, and the individual elementary magnets of the body 1 are also oriented in the direction of the axis of such cylindrical areas of the magnetic field. When alternating current of a predetermined frequency is then introduced into the coil 2 through the circuit 5, a deformation of the original magnetic field of the body takes place. This deformation of the magnetic field gives rise to a mechanical deformation of the body 1 and the free end of the body is thus set into torsional oscillations. The frequency of oscillations of the body 1 is identical with the frequency of the alternating current supplied through the circuit 5 to the coil 2.

The electromagnetic vibrator according to the present invention may be used with advantage wherever alternating current has to be transformed into mechanical oscillations. The vibrator is extremely simple in manufacture and therefore cheap.

We claim:

An electromagnetic vibrator comprising a base, an elongated torsional body of ferromagnetic material secured, at one end, to said base and being wound so that its longitudinal axis is in the shape of a helix, means connected to the opposite ends of said torsional body and passing a direct current through the latter, a helically wound coil on said body, with the axis of said coil being coaxial with the helical axis of said body, a source of alternating current connected to said coil so that the magnetic field resulting from the passage of the alternating current through said coil deforms the magnetic field resulting from the passage of the direct current along said torsional body and gives rise to a corresponding mechanical deformation for effecting oscillation of the other end of said body at the frequency of said alternating current, and a consumer of oscillations mechanically connected to said other end of the torsional body.

References Cited in the file of this patent

UNITED STATES PATENTS

| 351,905 | Eichemeyer | Nov. 2, 1886 |
| 357,054 | Watkins | Feb. 1, 1887 |
| 436,512 | Wiegand | Sept. 16, 1890 |
| 1,270,920 | Botz | July 2, 1918 |
| 1,934,061 | Hansel | Nov. 7, 1933 |